United States Patent
Ito et al.

(10) Patent No.: US 8,318,846 B2
(45) Date of Patent: Nov. 27, 2012

(54) PROCESS OIL COMPOSITION, OIL-EXTENDED ELASTOMER CONTAINING THE SAME AND OLEFIN-BASED THERMOPLASTIC ELASTOMER COMPOSITION

(75) Inventors: Yuichi Ito, Chiba (JP); Hidenari Nakahama, Sodegaura (JP); Kotaro Ichino, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 375 days.

(21) Appl. No.: 12/085,231

(22) PCT Filed: Nov. 10, 2006

(86) PCT No.: PCT/JP2006/322434
§ 371 (c)(1),
(2), (4) Date: May 20, 2008

(87) PCT Pub. No.: WO2007/060843
PCT Pub. Date: May 31, 2007

(65) Prior Publication Data
US 2009/0171006 A1    Jul. 2, 2009

(30) Foreign Application Priority Data
Nov. 25, 2005  (JP) .................................. 2005-339710

(51) Int. Cl.
*C08K 5/01* (2006.01)
(52) U.S. Cl. ........ 524/476; 524/570; 524/571; 524/572; 524/573; 524/574; 524/575; 524/575.5; 508/110; 508/591; 585/6.6; 585/7; 585/8; 585/9; 585/10; 585/11
(58) Field of Classification Search .................. 508/110, 508/591; 585/6.6, 7, 8, 9, 10, 11; 524/476, 524/570–579
See application file for complete search history.

(56) References Cited

U.S. PATENT DOCUMENTS

| | | | |
|---|---|---|---|
| 3,758,643 A | 9/1973 | Fischer | |
| 4,130,535 A | 12/1978 | Coran et al. | |
| 4,212,787 A | 7/1980 | Matsuda et al. | |
| 4,311,628 A | 1/1982 | Abdou-Sabet et al. | |
| 5,658,865 A * | 8/1997 | Yoshida et al. | 508/501 |
| 6,984,706 B2 | 1/2006 | Karato et al. | |
| 2003/0013623 A1 * | 1/2003 | Tse et al. | 508/591 |

FOREIGN PATENT DOCUMENTS

| | | |
|---|---|---|
| EP | 0 902 081 A1 | 3/1999 |
| EP | 1 741 746 A1 | 1/2007 |
| JP | 53-21021 | 6/1978 |
| JP | 55-18448 | 5/1980 |
| JP | 56-15741 | 4/1981 |
| JP | 56-15742 | 4/1981 |
| JP | 58-46138 | 10/1983 |
| JP | 58-56575 | 12/1983 |
| JP | 62-938 | 1/1987 |
| JP | 62-5913 | 2/1987 |
| JP | 62-250044 | 10/1987 |
| JP | 02-060951 | 3/1990 |
| JP | 3-100031 | 4/1991 |
| JP | 2000-239465 | 9/2000 |
| JP | 2001-2864 | 1/2001 |
| JP | 2001-49056 | 2/2001 |
| JP | 2001-270042 | 10/2001 |
| JP | 2003-3025 | 1/2003 |
| JP | 2003-64227 | 3/2003 |
| JP | 2003-268041 A | 9/2003 |
| JP | 2004-143255 | 5/2004 |
| JP | 2005-54054 | 3/2005 |
| WO | WO 2005/105912 A1 | 11/2005 |

OTHER PUBLICATIONS

Korean Office Action mailing date of Oct. 29, 2009 for Korean Patent Application No. 10-2008-7015366(4 pgs).
European Search Report mailed Feb. 16, 2010 received in corresponding European Application No. 06832486.2.

* cited by examiner

*Primary Examiner* — Peter D Mulcahy
(74) *Attorney, Agent, or Firm* — Foley & Lardner LLP

(57) ABSTRACT

An object of the present invention is to provide an olefin-based thermoplastic elastomer composition that has both weatherability and flexibility at low temperatures, is excellent in fluidity, and causes no stickiness even in the use at high temperatures; a process oil composition for elastomers that serves as the raw material of the thermoplastic elastomer composition and contributes to the above characteristics; and an oil-extended elastomer containing the process oil composition.

The process oil composition for elastomers of the present invention has a property that, when 20 parts by weight of the process oil composition for elastomers are blended with respect to 100 parts by weight of a propylene homopolymer, the melting point of the propylene homopolymer is lowered by 2 to 4.5° C. compared to that of the propylene homopolymer without blending. The process oil composition for elastomers is a mixture of a purified mineral oil and a synthetic oil obtained by polymerizing (an) olefinic monomer(s), wherein the ratio of the purified mineral oil to the synthetic oil is preferably 40/60 to 80/20.

11 Claims, No Drawings

US 8,318,846 B2

PROCESS OIL COMPOSITION, OIL-EXTENDED ELASTOMER CONTAINING THE SAME AND OLEFIN-BASED THERMOPLASTIC ELASTOMER COMPOSITION

TECHNICAL FIELD

The present invention relates to a process oil composition for elastomers, an oil-extended elastomer containing the composition, and an olefin-based thermoplastic elastomer composition comprising the oil-extended elastomer and a polypropylene-based resin. More particularly it relates to an olefin-based thermoplastic elastomer composition excellent in processability, flexibility at low temperatures, and fogging properties without stickiness.

BACKGROUND ART olefin-based thermoplastic elastomers are widely used as elastomers of energy-saving and resource-saving type, for a weather strip for automobiles (window frame, door glass run, draining lip, etc.), an automobile interior sheet (door trim material, ceiling material, instrument panel material, etc.), a bumper material, a mudguard material, various sealing materials for building, and the like.

Olefin-based thermoplastic elastomers are described, for example, in Japanese Patent Application Publication No. S53-21021 (Patent Document 1), Japanese Patent Application Publication No. S55-18448 (Patent Document 2), Japanese Patent Application Publication No. S56-15741 (Patent Document 3), Japanese Patent Application Publication No. S56-15742 (Patent Document 4), Japanese Patent Application Publication No. S58-46138 (Patent Document 5), Japanese Patent Application Publication No. S58-56575 (Patent Document 6), Japanese Patent Application Publication No. S59-30376 (Patent Document 7), Japanese Patent Application Publication No. S62-938 (Patent Document 8), Japanese Patent Application Publication No. S62-5913 (Patent Document 9), and the like. A non-crosslinked or crosslinked olefin-based thermoplastic elastomer is selectively used depending on the application.

A well-known olefin-based thermoplastic elastomer composition comprises an ethylene-based copolymer elastomer formed from ethylene, and an α-olefin having 3 to 20 carbon atoms and/or a nonconjugated polyene as an elastomer component. The following findings are reported, for example, in Japanese Patent Laid-open Publication No. H2-60951 (Patent Document 10): a mineral oil softener is blended in such a composition in order to improve workability and to facilitate dispersion of various types of fillers or to increase flexibility and elasticity through reducing hardness; and a mineral oil softener having a viscosity index of 80 or more is preferred because of the superiority in weatherability to other mineral oils.

However, when a paraffin-based mineral oil having viscosity index of 80 or more was used for the olefin-based thermoplastic elastomer composition, its characteristic of flexibility at low temperatures was sometimes deteriorated because of the high pour point of the mineral oil. Moreover, addition of a large amount of mineral oil sometimes caused bleeding-out, which damaged appearance of products, because a wax component contained in the paraffin-based mineral oil had poor compatibility with the olefin-based thermoplastic elastomer composition.

Furthermore, when a naphthene-based mineral oil was used in order to prevent the deterioration of flexibility at low temperatures, the olefin-based thermoplastic elastomer composition became gelled in a short period on exposure to sun light due to sulfur contained in the mineral oil, causing problems of chalking and deterioration of the properties. As described above, when the mineral oil-based softener was used in the olefin-based thermoplastic elastomer composition, there were problems in any of weatherability, flexibility at low temperatures, and stickiness due to the bleeding-out of oil.

Meanwhile, Japanese Patent Laid-open Publication No. 2001-049056 (Patent Document 11) disclosed blending a copolymer liquid synthetic softener that was formed from ethylene and an α-olefin having 3 to 20 carbon atoms and had a number average molecular weight of 400 to 2000, a pour point of −25° C. or lower, and a viscosity index of 120 or more, in place of blending the mineral oil, in the olefin-based thermoplastic elastomer. In practice, however, that blend was accompanied by the following problems: A high ethylene content in the synthetic softener lowered the compatibility of the softener with polypropylene which was a main component of the resin in the olefin-based thermoplastic elastomer composition, thereby deteriorating the fluidity and hence the processability; whereas a low ethylene content in the synthetic softener reduced the compatibility with the ethylene-based copolymer elastomer, possibly causing the bleeding-out of oil particularly in the use at high temperatures, which made the olefin-based thermoplastic elastomer composition sticky.

Patent Document 1: Japanese Patent Application Publication No. S 53-21021
Patent Document 2: Japanese Patent Application Publication No. S55-18448
Patent Document 3: Japanese Patent Application Publication No. S56-15741
Patent Document 4: Japanese Patent Application Publication No. S56-15742
Patent Document 5: Japanese Patent Application Publication No. S58-46138
Patent Document 6: Japanese Patent Application Publication No. S58-56575
Patent Document 7: Japanese Patent Application Publication No. S59-30376
Patent Document 8: Japanese Patent Application Publication No.
Patent Document 9: Japanese Patent Application Publication No. S62-5913
Patent Document 10: Japanese Patent Application Publication No. H2-60951
Patent Document 11: Japanese Patent Laid-open publication No. 2001-049056

DISCLOSURE OF THE INVENTION

Problems to be Solved by the Invention

Accordingly, to solve the problems in the conventional arts, the present invention has an object to provide an olefin-based thermoplastic elastomer composition that has both weatherability and flexibility at low temperatures, is excellent in fluidity, and causes no stickiness even in the use at high temperatures. Another object of the present invention is to provide a process oil composition for elastomers that serves as the raw material of the above elastomer composition and contributes to the above-mentioned characteristics; and an oil-extended elastomer containing the process oil composition.

Means to Solve the Problems

The process oil composition for elastomers of the present invention has a characteristic property that, when 20 parts by weight of the process oil composition for elastomers are blended with respect to 100 parts by weight of a propylene homopolymer, the melting point of the propylene homopolymer is lowered by 2 to 4.5° C. compared to that of the propylene homopolymer without blending. As another characteristic, the process oil composition for elastomers is a mixture of a purified mineral oil and a synthetic oil obtained by polymerizing (an) olefinic monomer(s), wherein the purified mineral oil and the synthetic oil are preferably mixed at a ratio of between 40/60 and 80/20. Preferably, the purified mineral oil used in the process oil for elastomers of the present invention mainly comprises paraffin, and it has a kinematic viscosity at 40° C. of 400 mm$^2$/s or less, has a percentage evaporation loss of 0.4% by weight or less when kept at 200° C. under atmospheric pressure for 1 hour, and has a flash point of between 260° C. and 300° C. Meanwhile, the synthetic oil used in the process oil for elastomers of the present invention, preferably, is a copolymer of ethylene and an α-olefin having 3 to 20 carbon atoms, has an ethylene content of 50 to 80 mol %, has a number average molecular weight of 3000 to 20000, and is manufactured using a metallocene catalyst.

The oil-extended elastomer of the present invention is an oil-extended elastomer obtained by blending the above process oil for elastomers with an ethylene-based copolymer elastomer, wherein the ethylene-based copolymer elastomer is preferably manufactured using a metallocene catalyst.

The olefin-based thermoplastic elastomer composition of the present invention is an olefin-based thermoplastic elastomer composition comprising the above oil-extended elastomer and a polypropylene-based resin, and it is preferably manufactured by a dynamic crosslinking process in the presence of a crosslinking agent. The dynamic crosslinking process means that thermal treatment is dynamically performed in the presence of a crosslinking agent, and "thermal treatment is dynamically performed" means that raw materials are kneaded in a molten state.

Effects of the Invention

The process oil for elastomers of the present invention has excellent compatibility with both an ethylene-based elastomer and a polypropylene-based resin. When the process oil is blended in an olefin-based thermoplastic elastomer composition, the resultant elastomer composition causes no stickiness due to the bleeding-out of oil components and is excellent in processability, flexibility at low temperatures, and fogging properties.

BEST MODE FOR CARRYING OUT THE INVENTION

The process oil for elastomers of the present invention has a property that, when 20 parts by weight of the process oil are blended with respect to 100 parts by weight of a propylene homopolymer, the melting point of the propylene homopolymer is lowered by 2 to 4.5° C. compared to that of the propylene homopolymer without blending. The degree of lowering in melting point caused by the blending is preferably 2.5 to 4.5° C. and more preferably 3.0 to 4.2° C. Owing to this property, the process oil for elastomers has good compatibility with the ethylene-based elastomer and the polypropylene-based resin, providing an olefin-based thermoplastic elastomer that hardly causes stickiness due to the bleeding-out of oil components.

As the process oil for elastomers of the present invention, any oil may be used if it satisfies the above properties. Preferably the process oil is a mixture of a purified mineral oil and a synthetic oil obtained by polymerizing (an) olefinic monomer(s). The ratio of the purified mineral oil to the synthetic oil in the mixture, represented as purified mineral oil/synthetic oil, is preferably in a range of 40/60 to 80/20 and more preferably in a range of 55/45 to 75/25. When the process oil for elastomers has a composition within the above range, it has better compatibility with the ethylene-based elastomer or the polypropylene-based resin in an olefin-based thermoplastic elastomer composition, thereby making the resultant olefin-based thermoplastic elastomer less likely to cause stickiness due to the bleeding-out of oil components.

Purified Mineral Oil

Publicly known purified mineral oils may be used as the purified mineral oil used in the present invention. Among these, a preferred purified mineral oil comprises mainly paraffin and has a kinematic viscosity at 40° C. of 400 mm$^2$/s or less, preferably 300 mm$^2$/s or less, in terms of the compatibility with the polypropylene resin. Furthermore, it is especially preferred that the purified mineral oil used in the present invention has a percentage evaporation loss of 0.4% by weight or less, preferably 0.2% by weight or less, when kept at 200° C. under atmospheric pressure for 1 hour, in terms of fogging properties. The flash point of such a purified mineral oil typically ranges from 240° C. to 300° C. An example of such a purified mineral oil is disclosed in Japanese Patent Laid-open Publication No. 2000-302919. The purified mineral oil is preferably obtained as follows: A paraffin-based crude oil is distilled under atmospheric pressure, and the resultant residual oil is distilled under vacuum with conventional procedures to obtain a distillate, which is dewaxed by solvent extraction or by hydrogenation, followed by hydrogenation finishing and subsequent stripping of a light fraction by vacuum distillation.

Synthetic Oil

The synthetic oil used in the present invention is preferably a copolymer of ethylene and an α-olefin having 3 to 10 carbon atoms and may contain a small amount of a polyene if necessary. A single α-olefin or two or more kinds of α-olefins may be used. Among such copolymers, ethylene/propylene copolymer is especially preferred. The ethylene content in the synthetic oil used in the present invention preferably ranges from 50 to 80 mol %, more preferably from 60 to 75 mol %, and especially preferably from 65 to 75 mol %.

The number average molecular weight of the synthetic oil preferably ranges from 3000 to 20000 and especially preferably from 4500 to 10000 in terms of polystyrene molecular weight. When the ethylene content and the molecular weight are within these ranges, the synthetic oil has good compatibility with the ethylene-based rubber, thereby providing an olefin-based thermoplastic elastomer that hardly causes stickiness due to the bleeding-out of oil components. The synthetic oil used in the present invention may be manufactured by any publicly known methods. In particular, it is preferably manufactured using a metallocene catalyst. A synthetic oil having a narrow molecular weight distribution is easily yielded using a metallocene catalyst, and hence an olefin-based thermoplastic elastomer excellent in fogging properties can be obtained.

Oil-Extended Elastomer

The process oil for elastomers of the present invention is suitably blended with an ethylene-based copolymer elastomer. As the ethylene-based copolymer elastomer used in the present invention, there may be used an amorphous random elastic copolymer elastomer formed from ethylene and an α-olefin having 3 to 20 carbon atoms; or an amorphous random elastic copolymer elastomer formed from ethylene, an α-olefin having 3 to 20 carbon atoms, and a nonconjugated polyene.

The molar ratio of ethylene to the α-olefin in said ethylene-based copolymer is typically 55/45 to 85/15, among which a preferred ratio is 60/40 to 80/20.

As the nonconjugated polyene, there may be specifically mentioned dicyclopentadiene, 1,4-hexadiene, cyclooctadiene, methylenenorbornene, ethylidenenorbornene, vinylnorbornene, and the like. Among these copolymer elastomers, ethylene/propylene/nonconjugated diene copolymer elastomer and ethylene/1-butene/nonconjugated diene copolymer elastomer are preferred, and ethylene/propylene/nonconjugated diene copolymer elastomer is especially preferred. Above all, particularly preferred are ethylene/propylene/ethylidenenorbornene copolymer elastomer and ethylene/propylene/vinylnorbornene copolymer elastomer because they provide elastomers with appropriate crosslinking structures.

The Mooney viscosity [ML1+4(100° C.)] of ethylene-based copolymer elastomer used in the present invention ranges from 50 to 300 and preferably from 100 to 200.

The iodine value of the ethylene-based copolymer elastomer preferably ranges from 3 to 30 and especially preferably from 5 to 25. When the iodine value of ethylene-based copolymer elastomer is in the above range, crosslinking takes place in a balanced manner, yielding an elastomer composition excellent in processability and rubber elasticity.

In the oil-extended elastomer, the process oil of the present invention is added in an amount of 100 parts by weight or less, preferably 80 parts by weight or less, and especially preferably 65 parts by weight or less, with respect to 100 parts by weight of the ethylene-based copolymer elastomer.

The ethylene-based copolymer elastomer is manufactured using an existing catalyst. For example, Japanese Patent Laid-open Publication No. H9-12790 discloses a method for manufacturing an ethylene-based elastomer using a metallocene catalyst. With this oil-extended elastomer, publicly known blending materials may be blended: a filler such as carbon black, calcium carbonate, talc, clay and silica; a crosslinking agent such as sulfur and an organic peroxide; various crosslinking promoters and additives; and the like, in order to use as a crosslinked (vulcanized) elastomer. This crosslinked (vulcanized) elastomer hardly causes the bleeding-out of oil components owing to use of the process oil of the present invention.

Olefin-Based Thermoplastic Elastomer Composition

The olefin-based thermoplastic elastomer of the present invention contains the above oil-extended elastomer and a polypropylene-based resin. The thermoplastic elastomer may be crosslinked or non-crosslinked, but a crosslinked elastomer is preferred in respect to rubber elasticity and heat resistance. When the crosslinking is performed, the olefin-based thermoplastic elastomer is preferably manufactured by publicly known dynamic crosslinking process.

The polypropylene-based resin used as the raw material of the olefin-based thermoplastic elastomer of the present invention is a high-molecular-weight solid product obtained by polymerizing a single monoolefin or two or more kinds of monoolefins. Such a resin includes, for example, an isotactic and a syndiotactic monoolefin polymer resins. Representative products of such resins are commercially available.

The above polypropylene-based resin is a homopolymer of propylene or a copolymer of propylene and (an)other α-olefin(s) wherein the major component is propylene. The α-olefin used here includes ethylene, 1-butene, 1-pentene, 1-hexene, 1-octene, 1-decene, 2-methyl-1-propene, 3-methyl-1-pentene, 4-methyl-1-pentene, 5-methyl-1-hexene, and the like. A mixture of two or more kinds of these olefins may be also used.

Any polymerization type may be adopted if a resinous product is obtained, whether it is random polymerization or blocked polymerization. These polypropylene-based resins may be used alone or in combination of two or more.

Among these polypropylene-based resins, especially preferred are, specifically, propylene homopolymer, propylene/ethylene block copolymer, propylene/ethylene random copolymer, propylene/ethylene/butene random copolymer, and the like.

The tacticity of polymer may be isotactic or syndiotactic. In particular, the isotactic polymer is more excellent in heat resistance.

The polypropylene-based resin used in the present invention preferably has an MFR (ASTM 1238-65T, 230° C.) ranging typically from 0.01 to 100 g/10 min and especially preferably from 0.05 to 50 g/10 min.

The above polypropylene-based resin has a role in improving the fluidity and heat resistance of the composition.

In the present invention, the polypropylene-based resin is used preferably at a ratio of no less than 10 parts by weight and less than 80 parts by weight, and more preferably at a ratio of 15 to 60 parts by weight, with respect to 100 parts by weight of the total of the polypropylene-based resin and the oil-extended elastomer.

When the polypropylene-based resin is used at a ratio in the above range, the resultant olefin-based thermoplastic elastomer composition is excellent in heat resistance, flexibility, rubber elasticity, and processability.

In the olefin-based thermoplastic elastomer of the present invention, besides the oil-extended elastomer, a combination of an elastomer other than the oil-extended elastomer with the oil-extended elastomer may be also used, so long as the objective of the present invention is not impaired. As such an elastomer other than the ethylene-based copolymer elastomer, there may be mentioned, for example, the above ethylene-based elastomer that is not extended with oil, propylene/ethylene copolymer rubber having a propylene content of 55 mol % or more, styrene/butadiene rubber and its hydrogenated derivative, styrene/isoprene rubber and its hydrogenated derivative, polybutadiene rubber, polyisoprene rubber, nitrile rubber, butyl rubber, polyisobutylene rubber, natural rubber, silicone rubber, and the like.

In the olefin-based thermoplastic elastomer relating to the present invention, a softener and/or an inorganic filler may be blended in addition to the polypropylene-based resin and the oil-extended elastomer.

The softener is preferably added when the oil-extended elastomer and the polypropylene-based resin are kneaded in a molten state. As the softener, there may be used the above purified mineral oil, the above synthetic oil, and a mixture thereof. Besides these, softeners typically used in rubber may be also used.

Specific examples are as follows:

petroleum materials such as process oil except the above-mentioned ones, lubricating oil, paraffin, liquid paraffin, petroleum asphalt, and vaseline;

coal tars such as coal tar and coal tar pitch;

fatty oils such as castor oil, linseed oil, rape oil, soybean oil, and palm oil;

waxes such as tall oil, bee's wax, carnauba wax, and lanoline;

fatty acids and their metal salts such as ricinoleic acid, palmitic acid, stearic acid, barium stearate, and calcium stearate;

synthetic polymers such as petroleum resin, coumarone-indene resin, and atactic polypropylene;

ester-type plasticizers such as dioctyl phthalate, dioctyl adipate, and dioctyl sebacate;

and others such as microcrystalline wax, rubber substitute (factice), liquid polybutadiene, modified liquid polybutadiene, liquid Thiokol; and the like.

The softener is used at a ratio of 100 parts by weight or less, preferably of 3 to 80 parts by weight, and more preferably of 5 to 50 parts by weight, as the total with a process oil for elastomers used for oil-extension, with respect to 100 parts by weight of the total of the polypropylene-based resin and the ethylene-based copolymer elastomer. When the softener is used at the above ratio, the resultant thermoplastic elastomer composition exhibits excellent fluidity in molding process and the mechanical properties of molded product is not deteriorated. In the present invention, if the softener is used at an amount over 100 parts by weight, the heat resistance of the resultant thermoplastic elastomer composition tends to decrease.

As the inorganic filler used in the present invention, there may be specifically mentioned calcium carbonate, calcium silicate, clay, kaolin, talc, silica, diatom earth, mica powder, asbestos, alumina, barium sulfate, aluminum sulfate, calcium sulfate, basic magnesium carbonate, molybdenum disulfide, graphite, glass fiber, glass beads, Shirasu-balloons, basic magnesium sulfate whisker, calcium titanate whisker, aluminum borate whisker, and the like.

In the present invention, the inorganic filler is used at a ratio of 100 parts by weight or less, and preferably of 2 to 30 parts by weight, with respect to 100 parts by weight of the total of the polypropylene-based resin and the ethylene-based copolymer elastomer. In the present invention, if the inorganic filler is used in an amount over 100 parts by weight, the elasticity and the processability of the resultant heat-resistant thermoplastic elastomer composition tend to decrease.

In the present invention, to the olefin-based thermoplastic elastomer, there may be further added conventionally publicly-known heat stabilizers, anti-aging agents, weather stabilizers, antistatic agents, crystal nucleating agents, and lubricants such as higher fatty acid amide, metal soap, wax, and silicone oil so long as the objective of the present invention is not impaired.

The olefin-based thermoplastic elastomer composition relating to the present invention can be obtained by mixing the polypropylene-based resin and the ethylene-based copolymer elastomer, and optionally the softener and/or the inorganic filler and the like, followed by dynamic thermal treatment. Here, "dynamic thermal treatment" means kneading in a molten state. The cross-linked olefin-based thermoplastic elastomer composition can be obtained by performing the dynamic thermal treatment in the presence of a crosslinking agent. The dynamic thermal treatment in the presence of a crosslinking agent is called dynamic crosslinking process. The crosslinking improves the heat resistance and the rubber elasticity of olefin-based thermoplastic elastomer.

The crosslinking agent used in this process includes a crosslinking agent commonly used for thermosetting elastomers such as an organic peroxide, phenol resin, sulfur, a hydrosilicon compound, amino resin, a quinone or its derivative, an amine compound, an azo compound, an epoxy compound, and an isocyanate among which an organic peroxide is especially preferred.

The organic peroxide used in the present invention includes, specifically, dicumyl peroxide, di-tert-butyl peroxide, 2,5-dimethyl-2,5-di(tert-butylperoxy)hexane, 2,5-dimethyl-2,5-di(tert-butylperoxy)hex-3-yne, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide, tert-butyl cumyl peroxide, and the like.

Among these, in respect to reactivity, odor, and scorch stability, especially preferred are bifunctional organic peroxides such as 2,5-dimethyl-2,5-di(tert-butylperoxy)hexane, 2,5-dimethyl-2,5-di(tert-butylperoxy)hex-3-yne, and 1,3-bis(tert-butylperoxyisopropyl)benzene, among which 2,5-dimethyl-2,5-di(tert-butylperoxy)hexane is the most preferred.

The organic peroxide is used at a ratio of 0.02 to 3 parts by weight and preferably of 0.05 to 1 part by weight with respect to 100 parts by weight of the total of the materials to be treated. If the organic peroxide is blended in an amount smaller than the above range, the resultant thermoplastic elastomer composition has a low degree of crosslinking, as a result, heat resistance, tensile property and rubber elasticity are insufficient. On the other hand, if the organic peroxide is blended in an amount over the above range, the processability of resultant thermoplastic elastomer composition may decrease due to an excessively high degree of crosslinking.

In the present invention, on the crosslinking treatment with the organic peroxide, there may be blended a peroxy crosslinking aid such as sulfur, p-quinone dioxime, p,p'-dibenzoylquinone dioxime, N-methyl-N,4-dinitrosoaniline, nitrosobenzene, diphenylguanidine, and trimethylolpropane-N,N'-m-phenylenedimaleimide; or a multifunctional vinyl monomer including divinylbenzene, triallyl cyanurate, a multifunctional methacrylate monomer such as ethylene glycol dimethacrylate, diethylene glycol dimethacrylate, polyethylene glycol dimethacrylate, trimethylolpropane trimethacrylate and allyl methacrylate, vinyl butyrate, and vinyl stearate.

It is expected that the crosslinking reaction proceeds uniformly and mildly when the above compound is used. Especially, divinylbenzene is the most preferred in the present invention. Divinylbenzene is easy to handle, has good compatibility with the crystalline polyolefin resin, which is a main component of the materials to be crosslinked, and with the ethylene-based copolymer elastomer, and serves as a dispersant of the organic peroxide due to the ability of dissolving the organic peroxide. Therefore, when divinylbenzene is used, the thermal treatment results in homogeneous crosslinking effect, providing a thermoplastic elastomer composition having well-balanced fluidity and other physical properties.

The above crosslinking aid or the above compound such as a multifunctional vinyl monomer is used at a ratio of typically 5 parts by weight or less, and preferably from 0.3 to 3 parts by weight, with respect to 100 parts by weight of the whole materials to be treated.

Furthermore, in order to accelerate decomposition of the organic peroxide, there may be used a decomposition accelerator, which includes a tertiary amine such as triethylamine, tributylamine, and 2,4,6-tri(dimethylamino)phenol; a naphthenate salt of aluminum, cobalt, vanadium, copper, calcium, zirconium, manganese, magnesium, lead, or mercury; and the like.

The dynamic thermal treatment in the present invention is preferably performed in closed equipment under an atmosphere of an inert gas such as nitrogen and carbon dioxide. The temperature of the thermal treatment ranges from the melting point of the crystalline polyolefin resin to 300° C., typically from 150 to 290° C., and preferably 170 to 270° C. The kneading period ranges typically from 1 to 20 min and preferably from 1 to 10 min. The shearing force to be applied ranges from 10 to 10,000 sec$^{-1}$ and preferably from 100 to 5,000 sec$^{-1}$ in terms of the shear rate.

As the kneading apparatus, there may be used a mixing roll, an intensive mixer (for example, Banbury mixer, kneader), a uniaxial or biaxial extruder, and the like. Closed-type apparatuses are preferred, and among them a biaxial extruder is especially preferred.

The olefin-based thermoplastic elastomer of the present invention is preferably subjected to static thermal treatment in hot air after the dynamic thermal treatment described above. The thermal treatment is preferably performed at 80 to 130° C. for approximately 1 to 10 hours. This thermal treatment can remove the residual crosslinking agent and the like, thereby reducing odor of the resultant product or improving the fogging properties of the product.

Moreover, a foamed product may be manufactured from the olefin-based thermoplastic elastomer of the present invention by adding a foaming agent as necessary. As the foaming agent optionally used in the present invention, there may be mentioned an inorganic foaming agent such as sodium bicarbonate and sodium carbonate; an organic foaming agent including a nitroso compound such as N,N'-dinitrosopentamethylenetetraamine and N,N'-dinitrosoterephthalamide, an azo compound such as azodicarbonamide and azobisisobutyronitrile, a hydrazide compound such as benzenesulfonyl hydrazide and p,p'-oxybis(benzenesulfonyl hydrazide), and an azide compound such as calcium azide and 4,4'-diphenyldisulfonyl azide; and a gaseous material such as carbon dioxide, nitrogen, and butane The amount of the foaming agent to be used is determined according to the desired specific gravity of foamed product. The foaming agent is used at a ratio of 0.2 to 50 parts by weight and preferably of 0.5 to 30 parts by weight with respect to 100 parts by weight of the ethylene/(α-olefin and/or a nonconjugated polyene) copolymer elastomer.

EXAMPLES

The excellent effects of the present invention will be explained with reference to Examples, but the present invention is not limited to these Examples.

Example 1

BY the same procedures as those described in Japanese Unexamined Patent Laid-open Publication No. 2000-302919, from a paraffin-based mineral oil refined by hydrogenation, light fraction amounting 10% by weight was removed by vacuum distillation to obtain purified mineral oil (1), which had a kinematic viscosity of 99 mm$^2$/s and a flash point of 275° C. When 10 g of the sample was kept at 200° C. under atmospheric pressure for 1 hour, the percentage evaporation loss was 0.14% by weight.

Lucant™ HC-3000X (manufactured by Mitsui Chemicals, Inc., ethylene/propylene random copolymer, ethylene content: 73 mol %, number average molecular weight: 7500 (in terms of polystyrene molecular weight, same for hereinafter)) was used as synthetic oil (1). Purified mineral oil (1) and synthetic oil (1) were sufficiently mixed with stirring at a ratio of 6/4, which was represented as purified mineral oil (1)/synthetic oil (1), to obtain process oil (1). Using a small batch mixer, 20 parts by weight of process oil (1) and 100 parts by weight of propylene homopolymer (1) (MFR (230° C., 2.16 kg loading):10 g/10 min)) were kneaded in a molten state at 200° C. to obtain an oil-extended polypropylene, which had a melting point of 157.8° C. as determined by DSC. The melting point of the same propylene homopolymer (1) in a non oil-extended state was 161.8° C. as measured in the same manner, the difference with that of the oil-extended polypropylene being 4.0° C. In measurement with DSC (differential scanning calorimeter), the temperature was raised at a rate of 10° C./min and the melting point was recorded during heating in the second run in which each run started at 20° C. and ended at 200° C.

The difference in melting point between the oil-extended polypropylene and the homopolypropylene without oil-extension is shown in Table 1.

By using rac-dimethylsilylenebis[1-(2-ethyl-4-isopropyl-7-methylindenyl)]zirconium dichloride as a metallocene catalyst, ethylene/propylene/5-ethylidene-2-norbornene random copolymer was obtained as ethylene-based elastomer (1). The ethylene content was 74 mol %, the Mooney viscosity [ML1+4(100° C.)] was 150, and the iodine value was 13.

Next, 100 parts by weight of ethylene-based elastomer (1) and 40 parts by weight of process oil (1) were sufficiently kneaded by using a Banbury mixer, followed by pelletizing to obtain oil-extended elastomer (1). By using a Henshel mixer, 55 parts by weight of pelletized oil-extended elastomer (1), 45 parts by weight of pelletized propylene homopolymer (1), 0.2 part by weight of 2,5-dimethyl-2,5-di(tert-butylperoxy)hex-3-yne (POX), which served as a crosslinking agent, and 0.3 part by weight of divinylbenzene (DVB), which served as a crosslinking aid, were sufficiently mixed, and the resultant mixture was fed at a predetermined flux to a biaxial extruder in which the barrel temperature was set from 160° C. to 230° C. to perform dynamic crosslinking, and the crosslinked material was pelletized. The pellets were thermally treated at 110° C. for 3 hours in an oven to remove the residual crosslinking agent, yielding pellets of olefin-based thermoplastic elastomer (1). Resultant thermoplastic elastomer (1) was injection-molded by an injection molding machine of 100 t into a plate with dimensions of 150×120×3 mm, and the appearance of molded product was evaluated. A specimen with notch for Izot impact testing (ASTM D256) was molded in the same way and the impact test was carried out at −30° C. With respect to fogging properties, the fogging test was performed in accordance with DIN 75201 at 100° C. for 5 hours using 10 g of the pellets to measure the fogging degree (%) of glass. The plate obtained by the injection-molding was kept in an air oven at 80° C. for 500 hours, and the stickiness was evaluated immediately after the plate was taken out of the oven. The results are shown in Table 1.

Example 2

By the same procedures as those in Example 1, purified mineral oil (1) and synthetic oil (1) were sufficiently mixed with stirring at a ratio of 7/3 to obtain process oil (2). An oil-extended polypropylene and non oil-extended homopolypropylene were obtained by the same method as that in Example 1, and their melting points were measured with DSC. The results are shown in Table 1.

Next, 100 parts by weight of ethylene-based elastomer (1) and 80 parts by weight of process oil (1) were sufficiently mixed with stirring using a Banbury mixer, followed by pelletizing to obtain oil-extended elastomer (2). In the same way as that in Example 2, 80 parts by weight of pelletized oil-extended elastomer (2), 20 parts by weight of pelletized propylene homopolymer (1), 0.4 part by weight of 2,5-dimethyl-2,5-di(tert-butylperoxy)hex-3-yne (POX), which served as a crosslinking agent, and 0.4 part by weight of divinylbenzene (DVB), which served as a crosslinking aid, were sufficiently mixed with stirring using a Henshel mixer to obtain pellets of olefin-based thermoplastic elastomer (2). The appearance of molded product, Izot impact strength, fogging properties, and stickiness were evaluated in the same way as that in Example 1. The results are shown in Table 1.

Comparative Example 1

Production and evaluation were performed in the same way as that in Example 2, except that purified mineral oil (1) was used alone for oil-extension of the ethylene-based elastomer without using synthetic oil (1).

Comparative Example 2

Production and evaluation were performed in the same way as that in Example 2, except that synthetic oil (1) was used alone for oil-extension of the ethylene-based elastomer without using purified mineral oil (1).

Comparative Example 3

Purified mineral oil (2) and noncrystalline polymer (1) were sufficiently mixed with stirring at a ratio shown in Table 1 to obtain a process oil. An oil-extended polypropylene and a non oil-extended homopolypropylene were obtained by the same method as that in Example 2, and their melting points were measured with DSC. The results are shown in Table 1.

Next, 100 parts by weight of ethylene-based elastomer (1), 25 parts by weight of purified mineral oil (2) (product name "PW-380", manufactured by Idemitsu Kosan Co., Ltd.), and 15 parts by weight of noncrystalline polymer (1) (propylene/1-butene noncrystalline copolymer, propylene content: 73 mol %, density: 0.87 g/cm$^3$, melt viscosity at 190° C.: 6000 cPs, MN5800) were sufficiently kneaded using a Banbury mixer, and followed by pelletizing to obtain oil-extended elastomer (3). Pellets of olefin-based thermoplastic elastomer (5) were obtained by using 55 parts by weight of pelletized oil-extended elastomer (3), 45 parts by weight of pelletized propylene homopolymer (1), 0.2 part by weight of 2,5-dimethyl-2,5-di(tert-butylperoxy)hex-3-yne (POX), which served as a crosslinking agent, and 0.3 part by weight of divinylbenzene (DVB), which served as a crosslinking aid, in the same way as that in Example 1. The pellets were injection-molded in the same manner as that in Example 1, and the appearance of molded product, impact resistance, fogging properties, and stickiness were evaluated. The results are shown in Table 1.

INDUSTRIAL APPLICABILITY

The olefin-based thermoplastic elastomer composition of the present invention can be widely used for a weather strip for automobiles (window frame, door glass run, draining lip, etc.), an automobile interior part (door trim material, ceiling material, instrument panel material, various grips, levers, etc.), a bumper material, a mudguard material, dust cover material, various sealing materials for building, commodities, and the like.

TABLE 1

Examples and Comparative Examples

| Composition of process oil for elastomers | Ethylene content mol % | Number average molecular weight | Example 1 | Example 2 | Comparative Example 1 | Comparative Example 2 | Comparative Example 3 |
|---|---|---|---|---|---|---|---|
| Purified oil (1) | — | — | 60 | 70 | 100 | | |
| Purified oil (2) | — | — | | | | | 62.5 |
| Synthetic oil (1) | 73 | 7500 | 40 | 30 | | 100 | |
| Noncrystalline polymer (1) | | | | | | | 37.5 |
| Difference in melting point between non-extended PP and oil-extended PP (° C.) | | | 4.0 | 3.3 | 4.7 | 1.3 | 5.1 |
| Amount (parts by weight) of oil added for oil-extension with respect to 100 parts by weight of ethylene-based elastomer | | | 40 | 80 | 80 | 80 | 40* |
| Composition of olefin-based thermoplastic elastomer | | | High hardness blending | Low hardness blending | Low hardness blending | Low hardness blending | High hardness blending |
| Propylene homopolymer | | | 45 | 20 | 20 | 20 | 45 |
| Oil-extended elastomer | | | 55 | 80 | 80 | 80 | 55* |
| POX | | | 0.2 | 0.4 | 0.4 | 0.4 | 0.2 |
| DVB | | | 0.3 | 0.4 | 0.4 | 0.4 | 0.3 |
| Appearance of molded product | | | Good | Good | Good | Flow mark observed | Good |
| Izot impact strength (J/m) at −30° C. | | | 3.0 | (Not broken) | (Not broken) | (Not broken) | 1.6 |
| Glass fogging degree (%) in fogging test | | | 2.3 | — | — | — | 4.6 |
| Stickiness after treated at 80° C. for 500 hr | | | Good | Good | Do | Poor | Do |

Stickiness: Good: Not sticky, Do: Slightly sticky, Poor: Significantly sticky

*The oil-extended elastomer of Comparative Example 3 contains a purified mineral oil and a noncrystalline polymer

The invention claimed is:

1. An oil-extended elastomer obtained by blending a process oil composition with an ethylene-based copolymer elastomer, wherein the process oil composition is a mixture of a purified mineral oil and a synthetic oil which is a copolymer of ethylene and an α-olefin having 3 to 10 carbon atoms having a number average molecular weight of 4500 to 10000, at a ratio of 40/60 to 80/20 of purified mineral oil to synthetic oil.

2. An oil-extended elastomer in which the process oil composition for elastomers according to claim 1 is blended with an ethylene-based copolymer elastomer.

3. An olefin-based thermoplastic elastomer composition comprising an oil-extended elastomer of claim 1 is blended with an ethylene-based copolymer elastomer, and a polypropylene-based resin.

4. The olefin-based thermoplastic elastomer composition according to claim 3, which is manufactured by a dynamic crosslinking process in the presence of a crosslinking agent.

5. The oil-extended elastomer of claim 1, wherein the synthetic oil has a number average molecular weight of 7500.

6. The oil-extended elastomer of claim 1, wherein the purified mineral oil contained in the process oil composition mainly comprises paraffin and has a kinematic viscoscity at 40° C. of 400 mm$^2$/s or less.

7. The oil-extended elastomer of claim 1, wherein the purified mineral oil contained in the process oil composition has a percentage evaporation loss of 0.4% by weight or less when kept at 200° C. under atmospheric pressure for 1 hour.

8. The oil-extended elastomer of claim 1, wherein the purified mineral oil contained in the process oil composition has a flash point of between 260° C. and 300° C.

9. The oil-extended elastomer of claim 1, wherein the synthetic oil contained in the process oil composition has an ethylene content of 50 to 80 mol %.

10. The oil-extended elastomer of claim 1, wherein the synthetic oil contained in the process oil composition is manufactured using a metallocene catalyst.

11. The oil-extended elastomer according to claim 1, wherein the ethylene-based copolymer elastomer is manufactured using a metallocene catalyst.

* * * * *